United States Patent

Souparis

[11] Patent Number: 5,928,456
[45] Date of Patent: Jul. 27, 1999

[54] METHOD FOR IRREVERSIBLY TRANSFERRING A DIFFRACTION GRATING, TRANSFER FILM AND DEVICE THEREFOR

[75] Inventor: Hugues Souparis, Paris, France

[73] Assignee: Hologram Industries S.A., Fontenay-Sous-Bois, France

[21] Appl. No.: 08/569,240
[22] PCT Filed: May 10, 1995
[86] PCT No.: PCT/FR95/00615
  § 371 Date: Feb. 24, 1997
  § 102(e) Date: Feb. 24, 1997
[87] PCT Pub. No.: WO95/31756
  PCT Pub. Date: Nov. 23, 1995

[30] Foreign Application Priority Data

May 11, 1994 [FR] France .................................. 94 05848

[51] Int. Cl.⁶ .................................................. B29C 65/00
[52] U.S. Cl. ...................... 156/285; 156/288; 156/324; 427/212; 427/123; 427/96
[58] Field of Search ................................ 428/41.1, 488.4, 428/913, 914, 195, 204, 192; 427/212, 96, 123; 156/52, 51, 324, 273.9, 288, 285

[56] References Cited

U.S. PATENT DOCUMENTS

| | | | |
|---|---|---|---|
| 4,846,922 | 7/1989 | Berge et al. ............................. | 156/324 |
| 4,908,285 | 3/1990 | Kushibiki et al. ........................... | 430/1 |
| 5,104,471 | 4/1992 | Antes et al. ............................. | 156/233 |

*Primary Examiner*—Merrick Dixon
*Attorney, Agent, or Firm*—Weiser and Associates, P.C.

[57] ABSTRACT

The present invention relates to a procedure for irreversibly transferring a diffraction grating, such as a stamped hologram, onto a substrate, such as a document or a product to be secured, which procedure consists of preparing a transfer film consisting of a supporting film substrate that carries at least one layer formed by a protective film overlay, a metallized or transparent reflective layer that carries the stamped optical image, and a layer of activatable adhesive. The procedure consists of superimposing the transfer film prepared in the above-described manner and of applying pressure with a transfer tool. The stage consisting of the preparation of the transfer film consists of depositing, onto a supporting film substrate whose dimensions are greater than those of the element to be transferred, at least one optical element whose dimensions correspond exactly to those of the element to be transferred onto the substrate. The transfer tool acts on a portion of the transfer film whose dimensions are greater than those of the surface that corresponds to the element to be transferred. The invention also relates to a transfer film and to a tool for the implementation of the procedure.

13 Claims, 2 Drawing Sheets

METHOD FOR IRREVERSIBLY TRANSFERRING A DIFFRACTION GRATING, TRANSFER FILM AND DEVICE THEREFOR

BACKGROUND OF THE INVENTION

1. Field of the Invention

The present invention relates to a procedure for irreversibly transferring a diffraction grating, such as a stamped hologram, onto a substrate, such as a document or a product to be secured, such as for example currency or banknotes, administrative documents, fiduciary documents, identification documents, and credit cards.

2. Description of the Related Art

The prior art includes essentially two methods for transferring an optical component such as a diffraction grating or a hologram stamped onto the surface of a document or of a product made of paper or of plastic, i.e.:

Heat marking; and
The application of a label.

Transfers that involve the application of a label are not readily compatible with automated marking methods. Furthermore, labels can easily be removed from their initial substrate and re-used on another substrate—a procedure that is contrary to the securing of the substrate.

Labels have been proposed that include an embrittlement layer that causes the localized separation of the layers in the event of an attempt to remove the label. However, it is difficult to make the label sturdy enough to withstand everyday handling of the document to which it is applied, and at the same time to ensure the effectiveness of the destructive separation in the event that an improper attempt is made to remove the label.

In order to remedy these disadvantages, the prior art, as disclosed for example in British patent No. GB-2 181 993 and in British patent No. GB-1 129 739, has proposed a marking procedure, and particularly a heat-marking procedure, that involves preparing a multi-layer transfer film consisting of a very thin supporting film substrate, usually less than 25 microns thick; a heat-reactivatable adhesive; a transparent metallized or reflective layer deformed by stamping in order to carry the optical image; a protective film overlay; and a detachment layer.

The transfer is accomplished through the application of heat and strong pressure to the film with the aid of a tool that has the same shape as the element to be transferred. The heat locally reactivates the thermal adhesive, and the active layers of the optical component are glued in accordance with the contour of the tool.

The carrier film is then removed. The layers that form the optical component break along the line surrounding the periphery of the glued surface, in accordance with the shape of the transfer tool. The glued surface then separates from the film substrate at the detachment layer.

This transfer procedure is satisfactory for optical components that consist of layers that are thin enough to ensure a clean break and separation of the active component along the line separating that component from the region containing the reactivated adhesive.

However, this procedure is not compatible with the transfer of optical components that consist of thick layers, or with the use of transfer films that include a thick supporting film substrate.

Moreover, the transfer tool is specific to the element to be transferred, inasmuch as its shape must correspond exactly to the shape of the optical component that is to be deposited onto the substrate. Furthermore, for continuous transfers, the optical image carried by the film must be positioned automatically under the heating tool. This procedure requires the use of optical registration systems located on the transfer matrix.

Finally, the choice of adhesive is critical, because the adhesive in question must allow a clean break along the edge of the glued region.

SUMMARY OF THE INVENTION

The goal of the present invention is to remedy these disadvantages by proposing a procedure that allows the transfer to be accomplished with the aid of a non-specific, inexpensive tool, and that also avoids the constraints associated with the thickness of the layers in the optical component or of the supporting film substrate, or with the nature of the adhesive.

In the procedure according to the invention, the stage consisting of the preparation of the transfer film includes depositing, onto a film substrate whose dimensions are greater than or equal to those of the element to be transferred, at least one optical component whose dimensions correspond exactly to those of the element to be transferred onto the substrate. The procedure in accordance with the invention is also characterized by the fact that the transfer tool acts on a portion of the transfer film whose dimensions are greater than those of the surface corresponding to the element to be transferred.

The transfer can be accomplished with the aid of a non-specific tool, such as a laminator or a heating press that has a matrix whose shape is independent of the shape of the optical component to be transferred.

Moreover, the procedure in accordance with the invention also makes it possible to transfer, without the use of heat, optical elements whose consecutive layers are more brittle than conventional labels and much thicker than the layers used in the heat-based transfer procedures known in the state of the art. The optical element consists of several layers, one of which carries the optical image, which is formed by stamping. The other layers may have optical or mechanical functions, such as for example an anti-wear function, and may carry printed matter. Once the optical element has been transferred to the intended document, the optical element can no longer be detached from its supporting substrate without being damaged. If an attempt is made to remove the optical element, the various layers that do not have the same mechanical strength are detached separately, and, because of their thinness, cannot be re-used to mark a non-authentic document.

The transfer is advantageously accomplished through the lamination of an assembly consisting of the superimposed substrate and transfer film.

In accordance with another variant, the supporting film substrate is continuous and the optical components are distributed over the film in such a way as to be transferred to a continuous substrate by lamination.

The invention also relates to a transfer film for the irreversible transfer of a diffraction grating, such as a stamped hologram, onto a substrate, such as a document or a product to be secured. The said transfer film consists of a supporting film substrate that carries at least one layer formed by a protective film, a metallized or transparent reflective layer that carries the stamped optical image, and a layer of adhesive that can be activated by a tool. The said transfer film is characterized by the fact that the supporting film substrate includes at least one pre-cut multi-layer optical component, and by the fact that the dimensions of the supporting film substrate are greater than the dimensions of the optical element.

In accordance with a variant, the thickness of the supporting film substrate is greater than 10 microns, and preferably between 25 microns and 100 microns.

In accordance with another variant, the dimensions of the supporting film substrate correspond to the dimensions of a substrate or of a juxtaposition of substrates, and the optical components are positioned on the supporting film substrate in such a way to be transferable onto the substrate or substrates as a result of the action of a single tool, such as a heating press or a laminating roller.

The invention also relates to a device for transferring a diffraction grating, such as a stamped hologram, onto a substrate, such as a document or a product to be secured, with the device in question consisting of a laminating roller.

The invention will be better understood through a reading of the following description, which makes reference to the attached drawings, on which:

BRIEF DESCRIPTION OF THE DRAWINGS

FIG. 1 represents a cross-sectional view of the transfer film. The transfer film consists of at least the following items:

DETAILED DESCRIPTION

Figure 1:
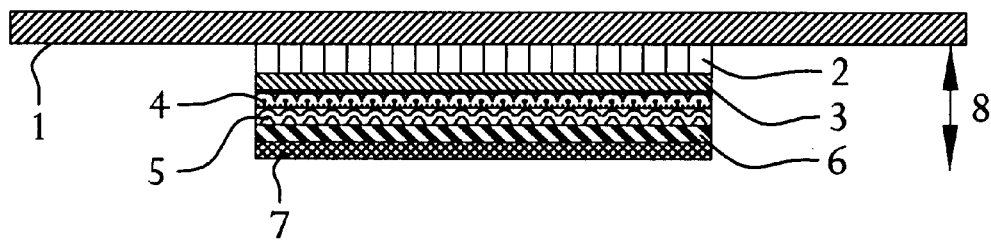
FIG. 1 represents a cross-sectional view of the transfer film.

A thick supporting film substrate 1, typically 12 to 50 microns thick, such as for example a film made of a transparent polyester;

A detachment layer 3;
A protective film overlay 4;
A metallized or transparent reflective layer 5 that carries the stamped optical image;
An optional layer 6 consisting of a protective film overlay; and
A layer of heat-reactivatable adhesive 7.

The layer consisting of a protective film overlay 4 is intended to prevent the removal or tearing-off of the optical element 8 from leaving a layer of adhesive 7 that carries the imprint of the stamped image formed on the surface of the reflective layer 5.

Depending on the selected embodiment, the transfer film may include an intermediate film 2, usually made of polyester, pasted to the supporting film substrate 1.

The optical element 8 is in the form of a multi-layer assembly that has been pre-cut so that it has the same shape as the marking component to be transferred.

The dimensions of the supporting film substrate 1 correspond, for example, to those of the document to be marked.

An example of the procedure for the manufacture or fabrication of a transfer film in accordance with the invention is provided hereinbelow.

First of all, a detachment layer 3, similar to the one utilized with heat-marking films, is applied to a preparatory polyester film. Then one or more layers of a protective film overlay 4 are applied, followed by a metallized or transparent reflective layer 5. The resulting assembly is stamped by a matrix that carries the optical image, grating, or hologram, in the form of surface elements in microrelief. The assembly is then coated with one or more layers of a protective film overlay 6, and then with a layer of adhesive 7.

Then the multi-layer assembly 8 is cut out. With the aid of an adhesive, the resulting multi-layer film 8 is glued to a supporting film substrate 1 or paper covered with a layer of an anti-adhesive substance, following the shape of the elements to be transferred. The cut-out elements are then detached from the film and are glued to the supporting film substrate 1, which will be used to transfer the element to the substrate to be marked, in accordance with an implantation that corresponds to the marking geometry to be implemented.

The layer of activatable adhesive 7 may be replaced by a permanent adhesive protected by a peelable film. Alternatively, this layer may be replaced by an adhesive that is reactivatable by ultraviolet radiation.

The transfer is then accomplished by detaching the peelable film and by applying the transfer film to the document to be marked. The supporting film substrate 1 is then detached from the detachment layer 3.

Some of the layers 2 to 6 may carry printed material, as applied in accordance with conventional printing procedures, particularly through the use of transparent inks that react to rays of ultraviolet light.

Figure 2:
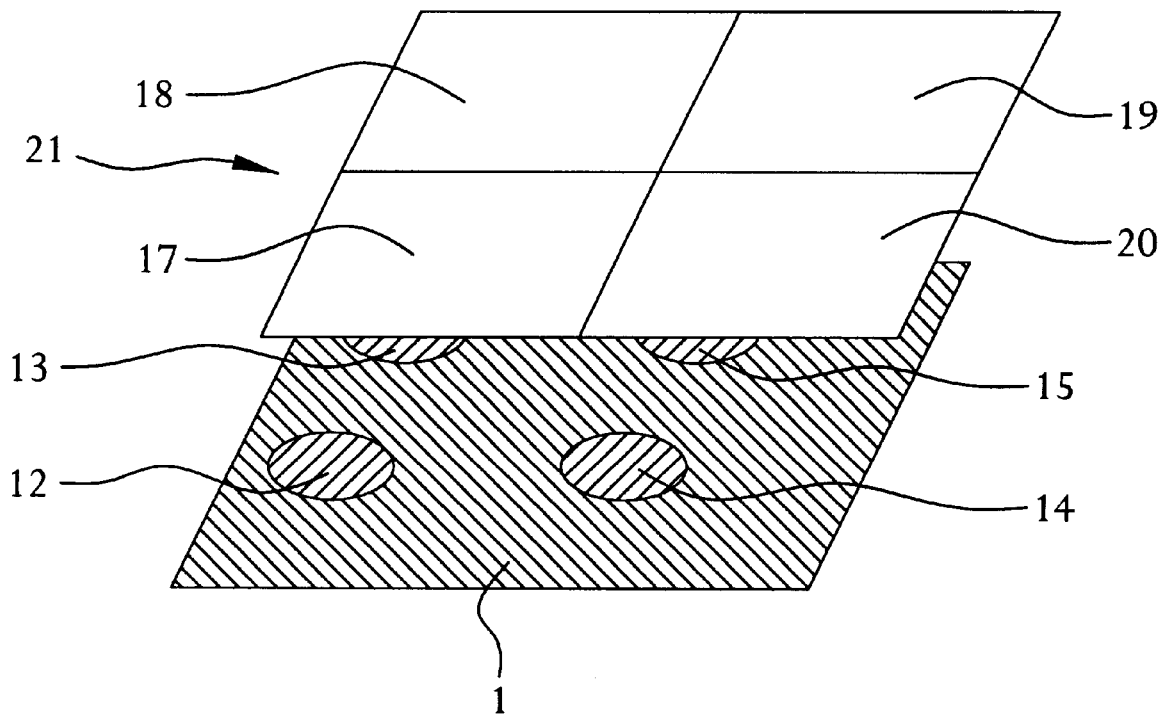
FIG. 2 represents a top view of the transfer film and of the document intended to receive the optical elements.

FIG. 2 represents a view of a transfer film consisting of a supporting film substrate 1 that carries four multi-layer optical elements 12 to 15.

The said elements 12 to 15 are arranged in accordance with a matrix whose geometry corresponds to that of the stack 21 of documents 17 to 20 to be marked. The superimposition of the supporting film substrate 1 and of the stack 21 of documents ensures the accurate positioning of the elements 12 to 15 to be transferred in relation to the destination position on each of the documents 17 to 20.

Figure 3:
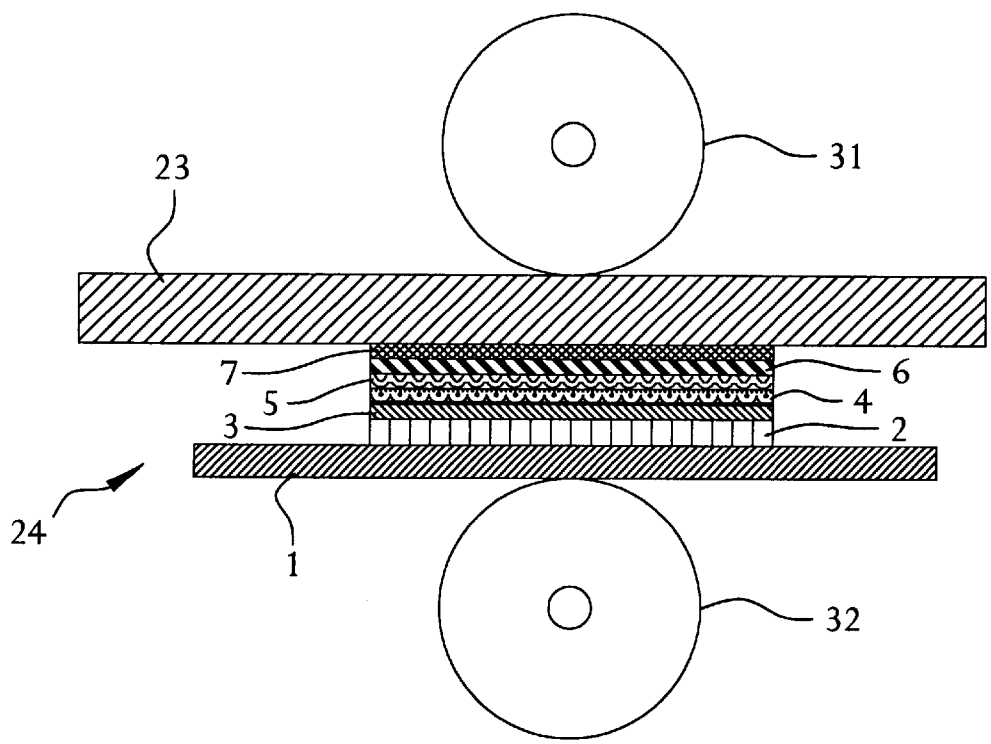
FIG. 3 represents a cross-sectional view of the transfer tool.

FIG. 3 represents a view of the transfer tool. The said tool includes two heating rollers 31 and 32 that ensure the application of pressure to the assembly formed by the substrate 23 intended to receive the optical element and the transfer film 24.

The rollers 31 and 32 ensure the lamination of the assembly and the reactivation of the layer of adhesive 7 that constitutes the layer located farthest from the supporting film substrate 1.

In a simplified variant of the invention, the polyester film 2 in the multi-layer assembly 8 is thick enough (e.g, 50 microns thick) to facilitate handling. The multi-layer assembly 8 is then cut out in the form of the marking to be transferred. The resulting "chip" is placed on the substrate document. The "substrate-chip" assembly is then heat-laminated or pressed and heated. The polyester film 2 is then detached manually. The shape of the "chip" and of the substrate may be identical. This is the case, for example, for a transfer made onto the entire surface of a credit card.

Figure 4:
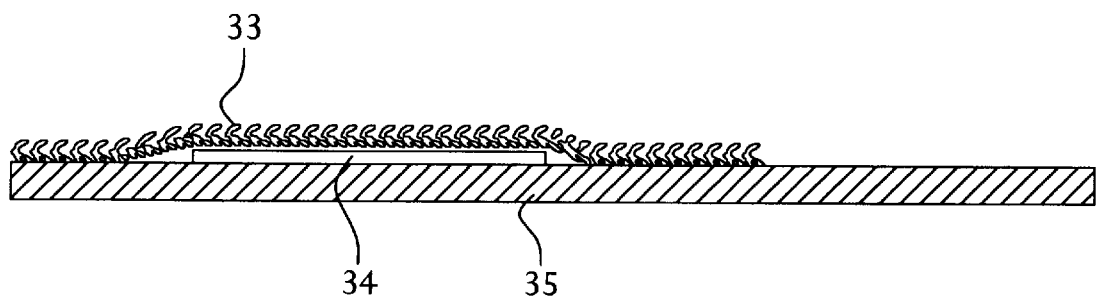
FIG. 4 represents a cross-sectional view of a specific example of an embodiment.

FIG. 4 represents a specific variant of an embodiment. The optical element 33, which consists of various layers, is deposited onto a portion of the document 35 to be marked, which document includes a photograph 34 that has been placed (or, preferably, glued) prior to the marking procedure. The layers form simultaneously an authentification mark and sealing means, whose removal causes the destruction of the document and hence the loss of the authenticated nature of the document.

The invention has been described hereinabove in the form of a non-limitative example. Those skilled in the art will be able to implement different variants without departing from the scope of the invention in so doing.

I claim:

1. A method for permanently laminating a diffraction grating onto a substrate, comprising the steps of:
   (a) superimposing a transfer film over the substrate, whereby the transfer film comprises an assembly of a supporting film substrate, at least one protective film overlay, a reflective layer with the diffraction grating, and a layer of adhesive, wherein whereby the layer of adhesive is comprised of an adhesive which abuts the substrate;
   (b) feeding the superimposed transfer film and substrate into a transfer tool comprised of a pair of pressure and heat-applying rollers positioned on opposing sides of the superimposed transfer film and substrate;
   (c) concurrently applying pressure and heat by way of the pair of the rollers to the superimposed transfer film and substrate to permanently join the superimposed transfer film and substrate; and
   (d) collecting the superimposed transfer film and substrate.

2. The method of claim 1, whereby the adhesive is a heat-activatable adhesive.

3. The method of claim 1, whereby the adhesive is a permanent adhesive and the layer of adhesive is protected by a peelable film that is removed prior to superimposing the transfer film over the substrate.

4. The method of claim 1, whereby the adhesive is reactivatable by ultraviolet radiation and the layer of adhesive is activated by irradiation with ultraviolet radiation prior to superimposing the transfer film over the substrate.

5. The method of claim 1, whereby the transfer film is superimposed over a portion of the substrate carrying a photograph.

6. The method of claim 1, whereby the diffraction grating is a stamped hologram.

7. The method of claim 1, whereby a photograph, separate from the substrate, is placed between the substrate and transfer film, such that step (b) permanently seals the photograph between the superimposed transfer film and substrate.

8. The method of claim 1, whereby the dimensions of the supporting film substrate are greater than the dimension of the diffraction grating.

9. The method of claim 1, whereby the supporting film substrate is greater than 10 micros and preferably between 25 microns and 100 microns.

10. A method for permanently laminating a diffraction grating into a substrate, comprising the steps of:
    (a) irradiating by ultraviolet light a transfer film over the substrate, whereby the transfer film comprises an assembly of a supporting film substrate, at least one protective film overlay, a reflective layer with a diffraction grating, and a layer of adhesive, whereby the layer of adhesive is comprised of an adhesive reactivatable by ultraviolet light which abuts the substrate;
    (b) feeding the superimposed transfer film and substrate into a transfer tool to permanently join the transfer film and the substrate; and
    (c) collecting the superimposed transfer film and substrate.

11. The method of claim 10, whereby the transfer film is superimposed over a portion of the substrate carrying a photograph.

12. The method of claim 10, whereby the diffraction grating is a stamped hologram.

13. The method of claim 10, whereby a photograph, separate from the substrate, is placed between the substrate and transfer film, such that step (b) permanently seals the photograph between the superimposed transfer film and substrate.

* * * * *